United States Patent [19]

Hotta

[11] Patent Number: 5,644,426
[45] Date of Patent: Jul. 1, 1997

[54] STRAP MOUNTING MECHANISM FOR AN OPTICAL VIEWING DEVICE

[75] Inventor: Keiichi Hotta, Tokyo, Japan

[73] Assignee: Asahi Kogaku Kogyo Kabushiki Kaisha, Tokyo, Japan

[21] Appl. No.: 585,620

[22] Filed: Jan. 16, 1996

[30] Foreign Application Priority Data

Jan. 18, 1995 [JP] Japan .................... 7-006050

[51] Int. Cl.⁶ ................... G02B 23/00; G02C 3/00; A45F 3/14
[52] U.S. Cl. ................ 359/409; 359/407; 351/157; 224/909
[58] Field of Search .................. 359/399, 404–409, 359/480–482, 808–811, 815–818, 896; 351/123, 155–158; 224/255, 257, 908, 909; 24/200

[56] References Cited

U.S. PATENT DOCUMENTS

| | | | |
|---|---|---|---|
| 3,787,688 | 1/1974 | Stone | 359/409 |
| 4,202,601 | 5/1980 | Burbo et al. | 359/409 |
| 4,761,068 | 8/1988 | Star | 351/157 |
| 4,898,311 | 2/1990 | Boyer | 224/909 |

*Primary Examiner*—Thong Nguyen
*Attorney, Agent, or Firm*—Kane, Dalsimer, Sullivan, Kurucz, Levy, Eisele and Richard, LLP

[57] ABSTRACT

A strap mounting mechanism for an optical viewing device, such as binoculars, has a lens barrel body and a cover member which closes an opening of the lens barrel on the eyepiece side. The lens barrel body is provided at a circumferential surface thereof adjacent to the cover member, with a through hole. The cover member is provided with a strap insertion opening and a strap guide wall integral therewith, which is fitted at its one end in the through hole and is connected at the other end to the strap insertion opening to define a strap passage in the lens barrel body.

9 Claims, 4 Drawing Sheets

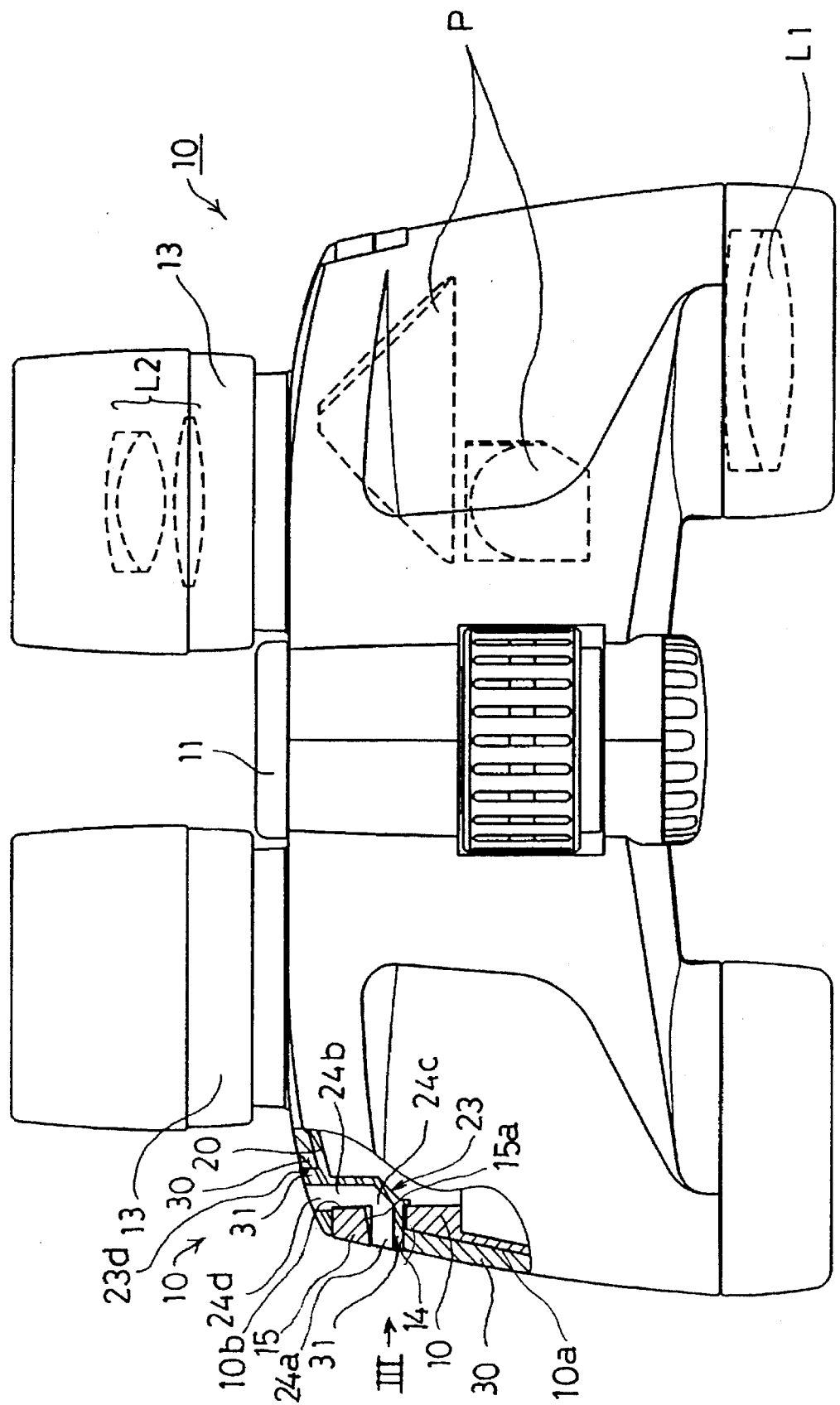

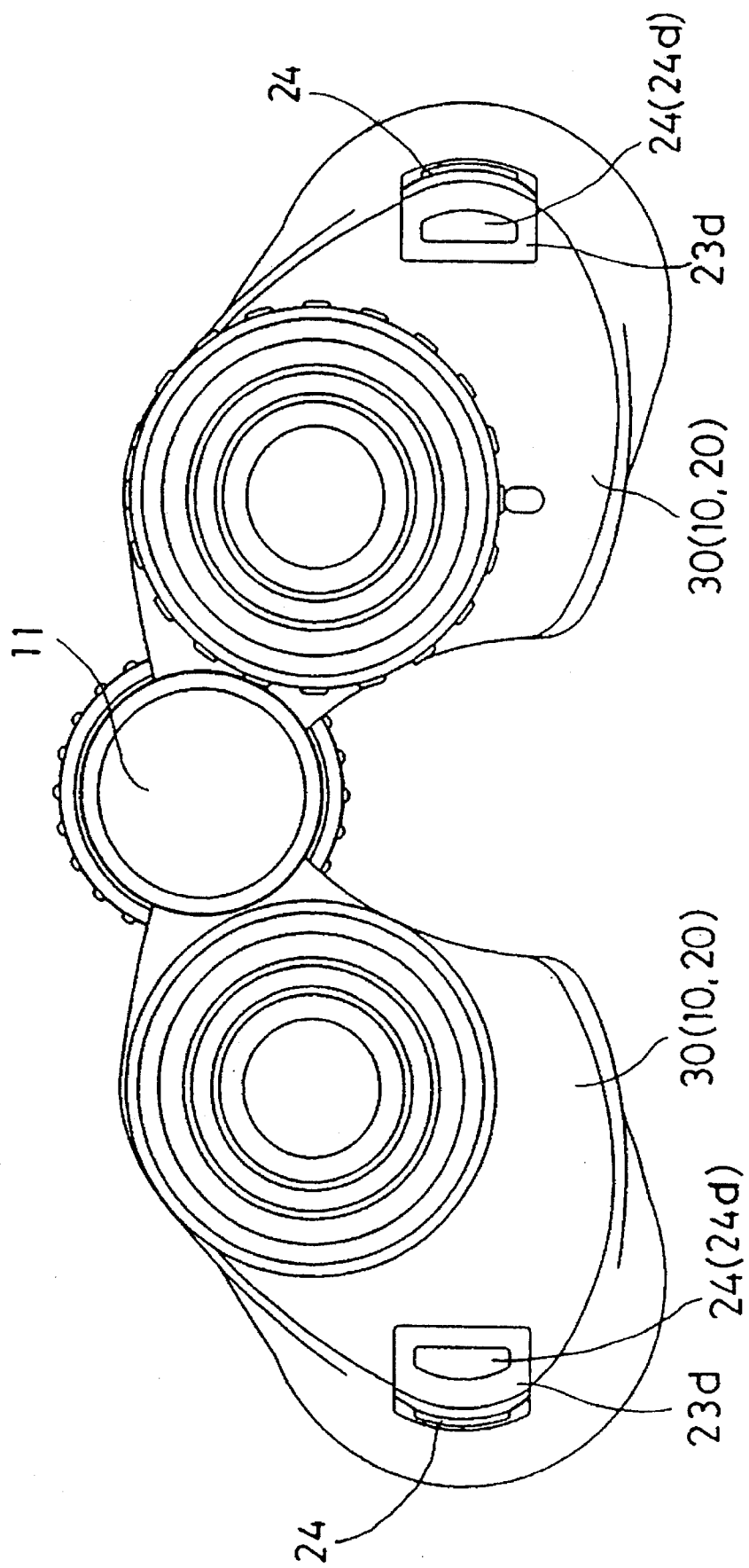

STRAP MOUNTING MECHANISM FOR AN OPTICAL VIEWING DEVICE

BACKGROUND OF THE INVENTION

1. Field of the Invention

The present invention relates to a strap mounting mechanism for an optical viewing device, such as binoculars or a monocular.

2. Description of Related Art

In general, binoculars are provided with strap lugs (rings) through which a strap is inserted for carrying purposes. The lugs are usually in the form of projections provided on the outer surface of a lens barrel body of the binoculars. The obstructive projections mar the appearance of the binoculars and complicate the shape of the casting or molding (resin molding) die.

SUMMARY OF THE INVENTION

It is an object of the present invention to provide a strap mounting mechanism for an optical viewing device, in which a strap insertion hole does not constitute a projection.

To achieve the object mentioned above, according to an aspect of the present invention, there is provided a strap mounting mechanism for an optical viewing device comprising a lens barrel body having an opening at an eyepiece lens side thereof. A cover member closes the opening of the lens barrel body. A through hole is formed on the lens barrel body, and is located at a circumferential surface of the lens barrel body. A strap insertion opening and a strap guide wall, having a generally L-shaped passage, are both provided on the cover member. One end of the strap guide wall is connected to the strap insertion opening and the other end is connected to the through hole of the lens barrel body. It is preferred that the through hole is directed in a direction substantially parallel to an optical axis of the optical viewing device.

Preferably a rubber cover is provided which covers the lens barrel body and the cover member, without closing the strap insertion opening and the through hole. The rubber cover has no projections.

It is further preferred that the strap mounting mechanism for an optical viewing device comprises right and left lens barrel bodies having openings at the rear ends thereof, right and left cover members which close the openings of the lens barrel bodies, through holes provided on the circumferential walls of the lens barrel bodies, strap insertion openings provided on the cover members, which are located at the rear end of the lens barrel bodies and strap guide walls, one ends of which are integral with the strap insertion openings, the other ends of which are inserted in the through holes of the lens barrel body to define strap passages.

The present disclosure relates to subject matter contained in Japanese Patent Application No. 7-6050 (filed on Jan. 18, 1995) which is expressly incorporated herein by reference in its entirety.

BRIEF DESCRIPTION OF THE DRAWINGS

The invention will be described below in detail with reference to the accompanying drawings, in which:

FIG. 1 is a partially sectioned plan view of a binocular having a strap mounting mechanism, according to an aspect of the present invention;

FIG. 2 is a front elevational view of FIG. 1;

DESCRIPTION OF THE PREFERRED EMBODIMENT

Figure 6:
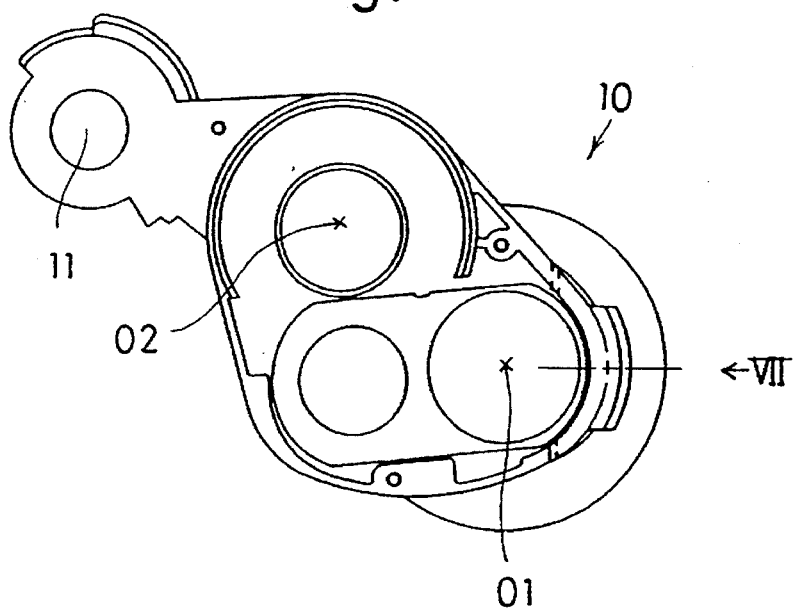
FIG. 6 is a front elevational view of a right lens barrel body of a binocular, according to an aspect of the present invention.
Figure 7:
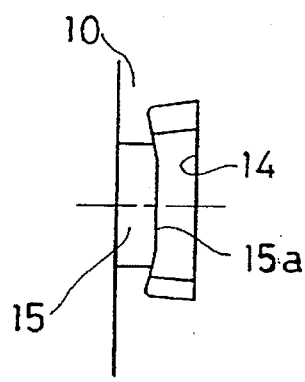
FIG. 7 is a side view of FIG. 6, as viewed from the direction indicated by the arrow VII in FIG. 4; and, FIG. 8 is a sectional view of the right cover member shown in FIGS. 4 and 5 and the right lens barrel body shown in FIGS. 6 and 7.

A binocular according to an aspect of the present invention is comprised of right and left lens barrel bodies (right half and left half) 10 whose shape is substantially symmetrical with respect to a center line thereof. The right and left halves 10 are rotatably connected to a shaft 11 (hinge). The right half lens barrel body 10 is shown in FIG. 6. Since the two halves are substantially the same, in the following description any reference regarding one half of the binocular is equally applied to the other half, unless stated otherwise.

FIG. 1 shows a number of optical elements of which the right half lens barrel body of the binocular is comprised, namely, an objective lens group L1, an image erecting prism P and an eyepiece lens group L2. The objective lens group L1 and the image erecting prism P are housed in the right lens barrel body 10. The eyepiece lens group L2 is housed in an eyepiece lens barrel 13, provided at the rear end of the lens barrel body 10. In FIG. 6, the numeral "O1" designates the optical axis of the right objective lens group L1, and the numeral "O2" designates the optical axis of the right eyepiece lens group L2. The optical axes O1 and O2 are connected by the associated image erecting prism P.

Figure 8:
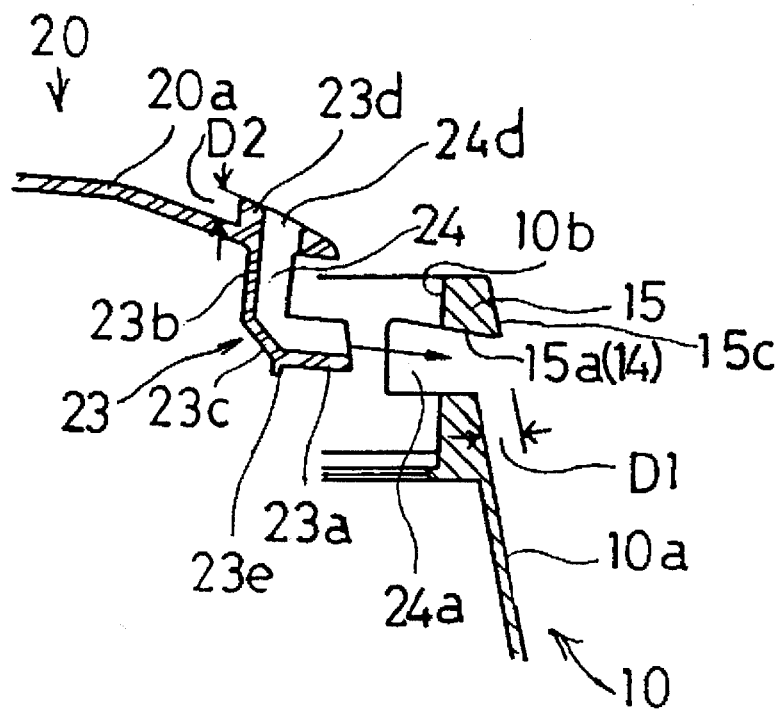

The right lens barrel body 10 is provided, on the outer circumferential (peripheral) wall of the rear end thereof, with a through hole 14 which extends in a direction substantially perpendicular to the optical axis O1. In the illustrated embodiment, the through hole 14 is located in the vicinity of the wall surface of the barrel body farthest from the shaft 11. As shown in FIG. 8, an outer decorative projection 15 is provided on the lens barrel body.

The opening of the right lens barrel body 10 adjacent to the eyepiece lens barrel 13 is closed by a right cover member 20. The right cover member 20 is provided with an insertion hole 21 in which the eyepiece lens barrel 13 (eyepiece lens group L2) is inserted and a hole 22 in which a screw is inserted to secure the cover member 20 to the right lens barrel body 10.

Figure 3:
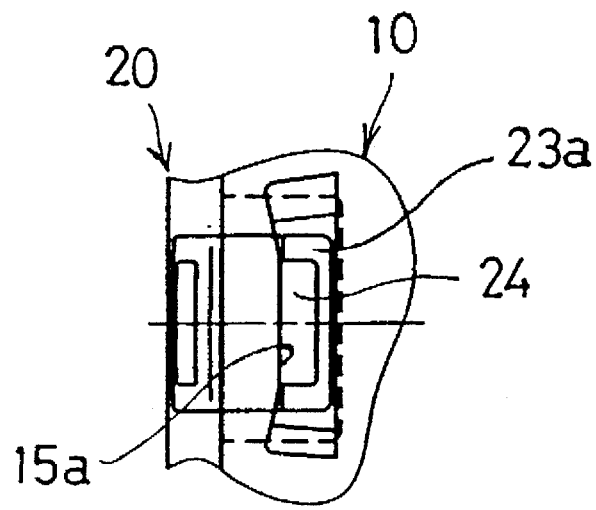
FIG. 3 is a side view of FIG. 1, as viewed from the direction indicated by the arrow III in FIG. 1.
Figure 4:
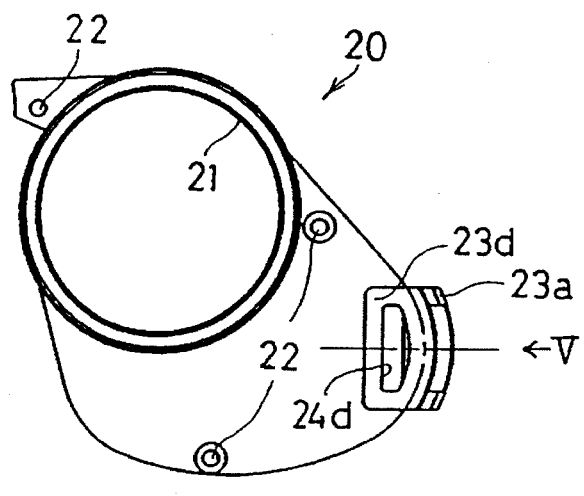
FIG. 4 is a front elevational view of a right cover member of a binocular.
Figure 5:
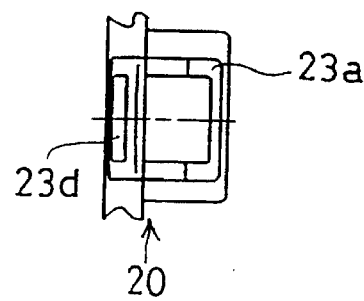
FIG. 5 is a side view of FIG. 4, as viewed from the direction indicated by the arrow V in FIG. 4.

The right cover member 20 is provided with a strap insertion opening 24d and a generally L-shaped strap guide wall 23 which is connected at one of its ends to the strap insertion opening 24d. The other end is connected to the through hole 14 of the right lens barrel 10. Namely, the strap guide wall 23 includes a wall surface portion 23a which defines a first straight passage 24a of a strap passage 24 between the wall surface portion 23a and the inner surface 15a of the outer projection 15, a wall surface portion 23b which defines a second straight passage 24b substantially perpendicular to the first straight passage 24a between the wall surface portion 23b and the inner surface 10b of the right lens barrel body 10 (projection 15), and an inclined connecting wall surface portion 23c which defines an inclined passage 24c and connects the wall surface portions 23a and 23b. The second straight passage 24b is connected to the strap insertion opening 24d. The wall surface portion 23a has a generally U-shaped flat end surface (FIGS. 3 and 5) which projects from the outer wall surface 10a of the right lens barrel body 10. The outer peripheral surface of the strap insertion opening 24d constitutes a projection 23d. There is provided a positioning projection 23e (FIG. 8) which engages with the inner wall surface 10b of the right lens barrel body 10.

The first straight passage 24a (wall surface portion 23a) extends in a direction substantially perpendicular to the optical axis O1, and the second straight passage 24b (wall surface portion 23b) extends in a direction substantially parallel with the optical axis O1.

As shown in FIG. 8, there are stepped portions (having a difference in height or width) D1 and D2 between the outermost wall surface 15c of the decorative projection 15 and the outer wall surface 10a of the right lens barrel body 10 and between the rear end surface 20a of the right cover member 20 and the rear end surface of the projection 23d of the strap guide wall 23, respectively. A rubber cover 30 (FIG. 1) which is attached to the right lens barrel body 10 and the right cover member 20 from the outside is fitted in the stepped portions D1 and D2, so that the stepped portions D1 and D2 can not be seen. Namely, the rubber cover 30 has a thickness corresponding to the differences D1 and D2 and is provided with an opening 31 corresponding to a projection defined by the projection 23d, the generally U-shaped wall surface portion 23a and the decorative projection 15.

With the above-mentioned structure, the continuous strap insertion passage 24 is formed in the right lens barrel body 10 (and the rubber cover 30) without any substantial outward projection therefrom. A strap (not shown) can be inserted and held in the strap passage 24 by an appropriate holding means (not shown). The strap guide wall 23 prevents a foreign matter, such as dust, from entering the right lens barrel body 10. The strap when inserted and held in the strap passage 24, prevents the right cover member 20 from separating from the right lens barrel body 10.

Although the above mentioned discussion has been directed to a binocular comprised of right and left lens barrel bodies 10 which are rotatably connected to the shaft 11, the present invention can be applied to any type of binocular. Namely, the structure of the binocular itself is not limited to a specific or special type, in the present invention.

As can be seen from the foregoing, according to the present invention, the strap insertion passage is formed in the lens barrel body of a binocular, unlike the prior art in which strap hanging rings project outward. Thus, not only can an attractive binocular be obtained, but also no projections are provided, thus making storage easier, for example. Moreover, according to the present invention, the casting or molding dies or a split die mechanism for producing the lens barrel bodies or the cover members, etc., can be simplified.

What is claimed is:

1. A strap mounting mechanism for an optical viewing device comprising:
    a lens barrel body having an opening at an eyepiece lens side thereof;
    a cover member which closes said opening of the lens barrel body;
    a through hole which is formed on said lens barrel body, said through hole being located at a circumferential surface of said lens barrel body;
    a strap insertion opening and a strap guide wall both provided on said cover member, one end of said strap guide wall being connected to said strap insertion opening; and,
    the other end of said strap guide wall being connected to said through hole of said lens barrel body.

2. The strap mounting mechanism for an optical viewing device according to claim 1, further comprising a rubber cover which covers said lens barrel body and said cover member, without closing said strap insertion opening and said through hole.

3. The strap mounting mechanism for an optical viewing device according to claim 2, wherein said rubber cover comprises an outer portion with no projections.

4. The strap mounting mechanism for an optical viewing device according to claim 1, wherein said strap guide wall defines a generally L-shaped strap passage.

5. The strap mounting mechanism for an optical viewing device according to claim 1, wherein said through hole is directed in a direction substantially perpendicular to an optical axis of the optical viewing device.

6. The strap mounting mechanism for an optical viewing device according to claim 1, wherein said strap insertion opening is directed in a direction substantially parallel to an optical axis of the optical viewing device.

7. A strap mounting mechanism for an optical viewing device according to claim 1, wherein said optical viewing device is a pair of binoculars.

8. A strap mounting mechanism for an optical viewing device comprising:
    right and left lens barrel bodies having openings at the rear ends thereof;
    right and left cover members which close the openings of the lens barrel bodies;
    through holes provided on the circumferential walls of the lens barrel bodies;
    strap insertion openings provided on the cover members, which are located at the rear end of the lens barrel bodies; and
    strap guide walls, one ends of which are integral with the strap insertion openings, the other ends of which are inserted to said through holes of said lens barrel body to define strap passages in said lens barrel bodies.

9. A strap mounting mechanism for an optical viewing device according to claim 8, wherein said optical viewing device is a pair of binoculars.

* * * * *